Patented June 3, 1952

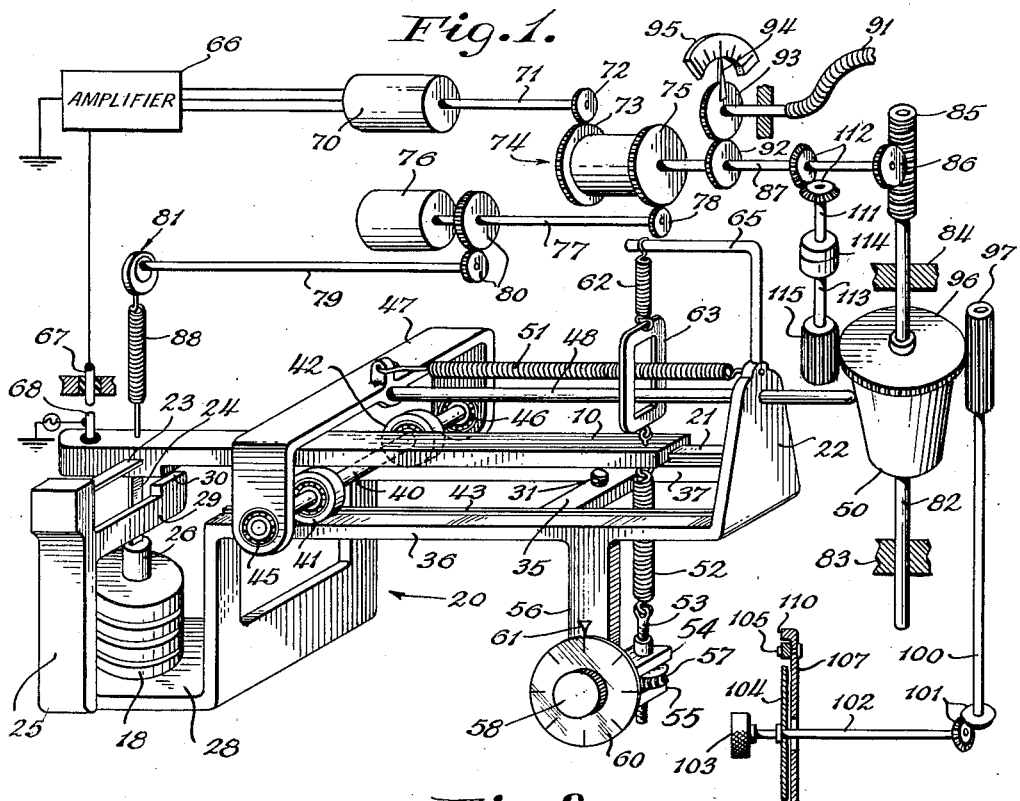

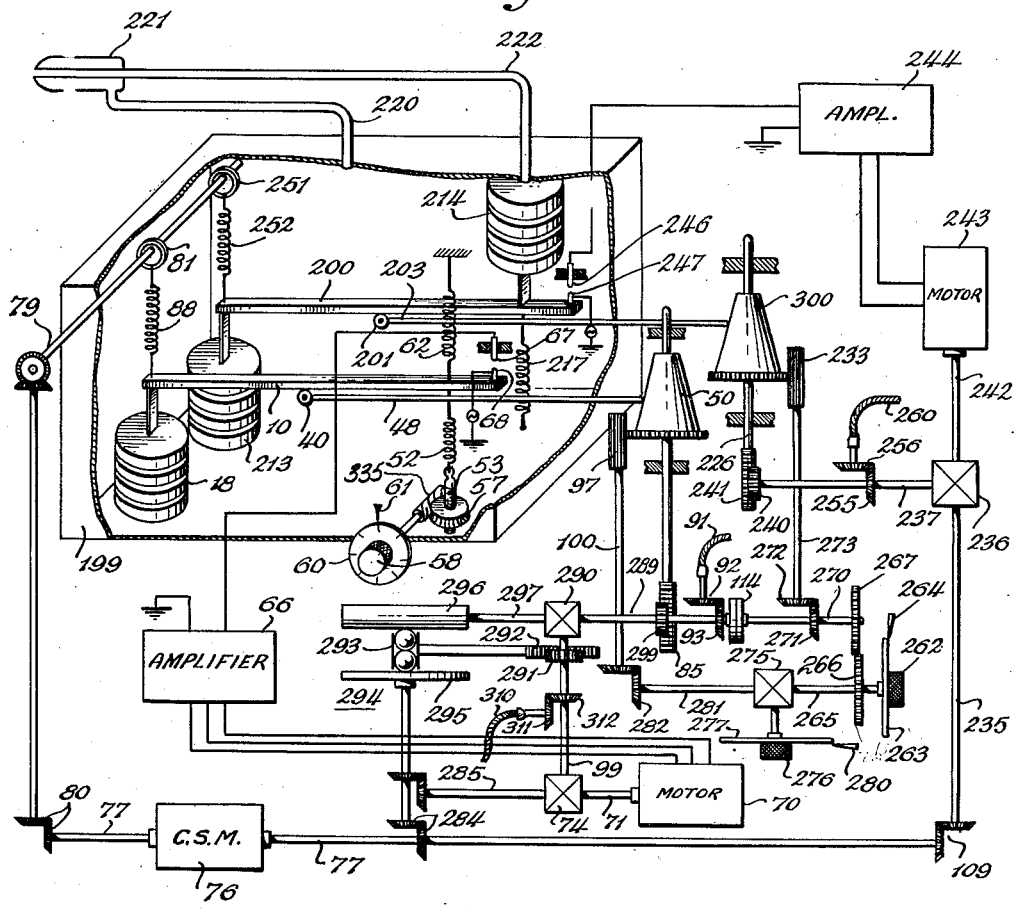

2,598,681

UNITED STATES PATENT OFFICE 2,598,681

TRUE AIR SPEED AND TRUE ALTITUDE RATE METER

Robert F. Garbarini, Woodside, and John R. Ericson, Westbury, N. Y., assignors to The Sperry Corporation, a corporation of Delaware Application June 29, 1946, Serial No. 680,366

11 Claims. (Cl. 73—182)

This invention relates to true altitude meters, true air-speed meters, and altitude-rate meters, either alone, or combined in compound instrumentalities, and essentially incorporating automatic force-ratio measuring systems. More particularly, the invention comprehends the fabrication and use of novel, self-contained, unitary or compound instruments for simultaneously measuring and comparing force-ratios of forces corresponding to interdependent variable and varying control conditions, or groups of control factors, and delivering torque outputs for operating equipment and mechanical power systems as functions of such force-ratios.

The above and other desirable features of novelty and advantages of the present invention will be described with particular reference to the utilization of unitary and compound measuring and computing instrument structures for obtaining torque outputs corresponding, singly or in desired combinations, to true air-speed, true altitude, and altitude rate values of moving vehicles, such as aircraft.

The instruments herein are characterized by a number of features of importance and novelty, including as a major feature, the use of a substantially rigid, yet mobile, shock-proof, hysteresis-free, force-ratio measuring device, which is maintained in dynamic balance to give a fluid, instantaneous response to any and all control or modifying factors applied thereto.

The instruments herein may be contained in a single casing which may serve as a chamber for force-responsive devices, wherein one or more fluid components, such as ambient air pressure, are to be measured. The pressure-responsive devices are operated on a null system wherein the bellows or aneroid elements are kept at substantially constant length over all variations in pressure.

The invention contemplates an arrangement of levers having movable fulcrums which are mounted for reciprocation along, and in parallel relation to, the longitudinal axis of the associated levers, and are respectively driven, unilaterally, by a common constant speed motor, to a position of unbalance of the lever. In one embodiment of the invention, a servomotor individual to each lever is effective, upon unbalance of the associated lever, to restore the fulcrum therefor to equilibrium position. This gives each fulcrum an inherent, cyclic, oscillating translation, about its equilibrium position, the magnitude of which is a function of the inertia of the balancing system described herein. When a change occurs in the ratios obtaining between the control forces acting on either lever, the lever is unbalanced, and rotates in the direction of the dominating force-moment, to operate contacts or other circuit controlling devices to open or close the circuit of the servomotor to effect translation of the fulcrum to a new, lever-balancing position. The application of a dynamic force measurement to one end of the lever will rock the lever in the direction of the applied force, and thereby increase the time of operation of the servomotor. This will serve to cause the translation of the fulcrum to the new equilibrium position demanded by the change in the applied force. The outputs of the respective servomotors are proportional to the ratio of the forces acting on the associated levers and any suitable servomotors may be selected to provide output torques of desired magnitude.

A true air-speed meter and a combination true air-speed-altitude rate meter according to the present invention will now to described with reference to the accompanying drawings, of which Fig. 1 is a schematic drawing of a true altitude meter;

Fig. 2 is a diagram of a lever arrangement;

Fig. 3 is a schematic drawing of one form of a true air-speed meter;

Fig. 4 shows schematically a combination true altitude meter-true air-speed meter and an altitude rate meter;

Figs. 5 and 6 show respectively an inductive pickoff device and a circuit therefor.

A true altitude meter, preferably of the kind disclosed and claimed in U. S. Letters Patent No. 2,557,092 issued June 19, 1951, to Robert F. Garbarini, relating to a Force Ratio Measuring Apparatus, is used in connection with the present invention, as well as certain features of the mechanism disclosed in said application, such as the lever structure. The true altitude meter shown in detail in Fig. 1 will be briefly described in connection with the diagram of Fig. 2.

The equation for altitude used herein as as follows:

(1) $$H = KT_{ma} \log\left(\frac{P_T}{P_S}\right)$$

or (2) $$H = KT_{ma}(\log P_T - \log P_S)$$

where $P_T$ = static air pressure at target or ground level,
$P_S$ = static air pressure at the airplane,
$T_{ma}$ = mean absolute temperature between the airplane and the target or ground level,
$K$ = constant,
$H$ = altitude of the airplane above the target or ground level.

Equation 1 shows that the true altitude is a function of the ratio of two pressures $P_T$ and $P_S$, or two forces, if the area over which the pressures act is taken as unity. A measure of this ratio can be obtained as the instant position of the fulcrum of a lever when the two force-moments are balanced.

A lever 10 having a fulcrum 12 is shown in the diagram of Fig. 2. Static pressure, $P_S$, as obtaining in an airplane in flight will be assumed to be applied to one arm of the lever at point 14, while the ground, or target pressure, $P_T$, will be assumed to be applied to the lever at point 16. With the moment arm assumed to be massless, and the length between the points 14 and 16 indicated by $L$, the force arms formed between fulcrum 12 and the ends 14 and 16 will be designated as $a$ and $b$, respectively.

The equation of the moments of force about fulcrum 12 is, therefore, (3) $$aP_S = bP_T$$

From the diagram it will be seen that (4) $$a = L - b$$

where $L$ is a constant. Substituting the value for $a$ from Equation 4 in Equation 3, there is obtained a value for $b$ according to the following equation:

(5) $$b = \frac{L}{1 + \frac{P_T}{P_S}}$$

Equations 3 and 5 hold when the lever is in the balanced positions only, because then the lever is back in the normal set up position and any undesirable torques due to deflection of the suspension means disappear from the moment equation.

Equation 5 shows that the arm $b$ is a measure of the ratio $$\frac{P_T}{P_S}$$

The position of fulcrum 12 can be calibrated, therefore, in this ratio.

Where one of the forces is constant, as, for example, target pressure $P_T$, the force ratios will be determined by the variation in the complementary force, e. g. static pressure $P_S$.

The pressure force can be balanced automatically by means of a suitable servo actuated mechanism such as shown in Fig. 1 wherein the lever 10 is provided with a shock resistant support. The lever has but one degree of freedom which is about its fulcrum. The lever, and various parts associated therewith are shown in Fig. 1 as being supported by a bracket 20.

Lever 10 is preferably supported by a flat spring 21 attached to one end of the lever and disposed in alignment therewith, one end of the spring being secured to an upright 22 of bracket 20. The opposite end of the lever is supported by flat spring 23. Spring 23 is fastened at one end to the side of the lever at right angles thereto in co-planar relation with spring 21. The opposite end of spring 23 is attached to upright 25 of bracket 20. A spring 24 is attached at one end to lever 10 and depends therefrom in right angle relationship to the plane of springs 21 and 23. The lower end of spring 24 is attached to a stud 26 on an evacuated bellows 18 fixed to the base 28 of bracket 20. Upright 25 is formed with a horizontal arm 29 having a stop portion 30 thereon disposed immediately underneath lever 10 but normally spaced therefrom which limits the rotation of the lever in one direction about its fulcrum. A similar stop 31 is provided for the opposite end portion of the lever. The latter stop is supported on a cross member 35 disposed between horizontal rails 36 and 37 formed in bracket 20 which support a movable fulcrum for lever 10.

The movable fulcrum for lever 10 as shown in Fig. 1 comprises a shaft 40 supported by ball bearing rollers 41 and 42 disposed on the shaft on opposite sides of the lever. Rollers 41 and 42 ride respectively on rails 36 and 37, the rails being channeled to provide suitable flanges 43 on opposite sides thereof for guiding the rollers thereon.

Ball bearing members 45 and 46 disposed on the fulcrum shaft near opposite ends thereof support respectively a pair of members depending from a yoke or carriage 47 having a horizontal rod 48 fixed thereto which is guided by an opening in upright 22. Rod 48 engages the surface of a three-dimension cam 50 and serves as a cam follower therefor, the cam being used to adjust the position of the carriage and thereby the fulcrum shaft 40 underneath lever 10. Spring 51 attached to carriage 47 and to upright 22 serves to hold cam follower 48 against the cam. The upper end of a spring 52 is fastened to the under side of the lever and the lower end to a screw 53 which extends through openings in spaced horizontal members 54 and 55 formed on a member 56 depending from rail 36. A nut 57 having a worm gear formed thereon is threaded onto screw 53 and is disposed between members 54 and 55. The nut 57 is turned by a knob 58 for the purpose of adjusting spring 52. The knob turns a worm 335, Fig. 4, in mesh with the worm gear on nut 57. A dial 60 is fixed with respect to knob 58 and cooperates with a stationary index 61. A spring 62 is attached to the upper side of lever 10 in alignment with spring 52 by a link 63 for the purpose of counterbalancing spring 52 as will be explained. The upper end of the spring is supported by an arm 65 attached to upright member 22.

An amplifier 66 has its input circuit controlled by cooperating contacts 67 and 68, the latter being mounted on lever 10 and the other disposed in a stationary support. The amplifier controls intermittently, according to the operation of the contacts, a servomotor 70 having a shaft 71 provided with a gear 72 which drives an input gear 73 of a differential 74. A second input gear 75 of the differential is driven by constant speed motor 76 which has a shaft 77 on which is a gear 78 in mesh with gear 75. Preferably, the effective rate of intermittently operable motor 70 is double that of constant speed motor 76. The mechanism actuated by the output of the differential will be described further on.

The shaft 77 of the constant speed motor drives a shaft 79 through gears 80 which actuates an eccentric mechanism 81 for vibrating a dither spring 88 attached to the eccentric mechanism and lever 10.

Dither spring 83 is disposed in alignment with the bellows 18 and is tensioned to counterbalance the inherent spring tension of the bellows when $P_S = 0$. The tension of spring 88 has no relation to the air pressure $P_S$ on the bellows. In other words, the bellows is initially set up in tension and even when open to the atmosphere would tend to collapse. Spring 88 stretches the bellows and counterbalances the tension thereof when the lever 10 is balanced and $P_s=0$. Under these conditions the bellows provides an accurate measure of air pressure and the inherent spring tension thereof is cancelled out and need not be considered. At this point it may be well to point out that spring 62 counterbalances similarly the initial spring tension of the $P_T$ force applying spring 52 when $P_T=0$. The counterbalance springs 88 and 62 are used during assembly respectively to counterbalance the bellows and spring 52 when the forces $P_s$ and $P_T$ are set at zero. The bellows force may be conveniently made zero by opening the bellows to the atmosphere. Spring 52 is set so as to be counterbalanced by spring 62 and then dial 60 is moved with respect to knob 58 until positioned at zero $P_T$ with reference to index 61. The dial is then secured with respect to knob 58 so as to move therewith. The counterbalancing arrangement for the spring and bellows just described greatly simplifies the construction and operation of the device by eliminating through cancellation a number of factors which otherwise would be necessary but awkward to consider in the equations.

Cam 50 is supported by a shaft 82 which is free to translate and rotate in bearings 83 and 84.

A circular rack 85 disposed on the upper end of cam shaft 82 is in mesh with a pinion 86 fixed to the output shaft 87 of the differential 74 which serves to displace cam 50 in translation. In the present embodiment of the invention, as will be described, the output displacement of shaft 87 is a measure of true altitude, and the shaft is shown as driving a flexible shaft 91 for a computer by means of gears 92 and 93. The differential output shaft 87 may be also used to control a local indicating device to show true altitude. For this purpose a pointer 94 attached to gear 93 is shown as cooperating with a scale 95 to indicate a measure of true altitude thereon.

Cam 50 has a gear 96 secured thereto in mesh with a long pinion 97 fixed on a shaft 100 coupled by gears 101, to a shaft 102 on which is fixed a knob 103. A scale 104, shown in section, fixed to shaft 102 cooperates with a lubber line 105 on a movable coaxially disposed ring 106 frictionally coupled to, and supported by a fixed plate 107 which carries an outer scale 110 to which lubber line 105 may be positioned. Knob 103 is used for positioning the cam in rotation. The cam may be also positioned in rotation from the output shaft 87 of the differential. For this purpose, shaft 87 drives shaft 111 through gears 112. Shaft 111 is coupled to shaft 113 by a friction clutch 114. A long pinion 115 on shaft 113 is in mesh with gear 96 on cam 50. Shaft 87 can displace the cam 50 in rotation by the mechanism just described to correct the position of the cam and also the position of scale 104 for the data represented by the displacement of the differential output shaft 87. When the cam is turned by knob 103, however, clutch 114 slips, so that beyond displacing the cam in rotation, adjustment of knob 103 has no effect on the apparatus.

In a true altitude computing device cam 50 is preferably laid out in translation in altitude, H, and rotation in mean absolute temperature, $T_{ma}$. This temperature may be set into the device manually, and varied automatically, by the drive including clutch 114, at about 1° Kelvin for each thousand feet change in altitude. The mean absolute temperature is taken as the arithmetical average of the static air temperature at the ground level, $T_t$, and the static air temperature at the airplane, $T_p$. This relation is shown in the following equation (6) $$T_{ma}=\frac{T_t+T_p}{2}$$

where $T_t$=absolute air temperature at the target or ground level, and $T_p$=absolute air temperature at the airplane.

The air temperature at the airplane increases approximately 1.98° Kelvin per thousand feet, with decreases in altitude where temperature inversion does not exist. Consequently, the mean absolute temperature, $T_{ma}$, will decrease at the approximate rate of .99° Kelvin per thousand feet of change.

In the present embodiment of the invention, the mean absolute temperature, $T_{ma}$, is introduced into the system by knob 103 which positions cam 50 in rotation. The stationary outer scale 110 associated with knob 103 is calibrated according to $T_t$. Ring 106 which is frictionally supported by plate 107, is adjusted to position the lubber line 105 thereon opposite the correct $T_t$ value on stationary scale 110. Dial 104 which is fixed with respect to knob 103 is calibrated for $T_p$, and knob 103 is moved to position dial 104 with reference to lubber line 105 thereby displacing shaft 102 in the sum of $T_t+T_p$. By introducing a suitable ratio (1:2) in the gear train by which cam 50 is rotated, the average of $T_t$ and $T_p$ is obtained.

As stated above, Equation 5 shows that the arm $b$ of lever 10 is a measure of the ratio $$\frac{P_T}{P_s}$$

and cam 50 may be laid out as to position fulcrum shaft 40 accordingly.

From the Equations 1 and 5

(7) $$H=KT_{ma}\log\left(\frac{L-b}{b}\right)$$

(8) $$\frac{H}{KT_{ma}}=\log\left(\frac{L-b}{b}\right)$$

(9) $$\frac{L-b}{b}=\log^{-1}\left(\frac{H}{KT_{ma}}\right)$$

Solving for $b$,

(10) $$L-b=b\log^{-1}\left(\frac{H}{KT_{ma}}\right)$$

(11) $$L=b\left(1+\log^{-1}\left[\frac{H}{KT_{ma}}\right]\right)$$

(12) $$b=1+\log^{-1}\left[\frac{H}{KT_{ma}}\right]$$

Equation 12 shows that the lift or travel $b$ of the cam follower rod 48 and fulcrum shaft 40 is a function of H and $T_{ma}$. L is a constant, and is the distance between the points of application of $P_s$ and $P_T$. The surface of cam 50 is laid out preferably according to Equation 12.

The flat springs 21 and 23 supporting lever 10 have sufficient flexibility to permit limited rotation of the lever about fulcrum shaft 40, which movement is restricted by stops 30 and 31 to a small angle and therefore the angular displacement of the lever about its fulcrum is always small. The fulcrum shaft 40 is free to turn within the ball bearing rollers 41 and 42 when the fulcrum is displaced, and therefore, the shaft may freely roll on the under surface of lever 10 while the rollers 41 and 42 roll in the opposite direction on tracks 36 and 37, which provides a substantially frictionless arrangement for displacing the fulcrum. Because of the mounting of the lever with flat springs and the elimination of sliding friction by the use of rolling action to translate the fulcrum, static friction energy losses are kept at a minimum. Also, since the lever is operated as a null device and is never allowed to get far out of balance, the movement of the springs attached thereto is kept small and hence energy loss due to hysteresis of the spring support is minimized. The dithering arrangement is provided to eliminate further effects of any static friction that may be present, and when the frequency of the dither mechanism is set at approximately twice the natural oscillatory frequency of the unit, the amplitude of oscillation of the servo response can be reduced to a negligible value.

In Fig. 1 constant speed motor 76 constantly drives into differential 74 in such direction that cam 50 is moved to displace carriage 47 and fulcrum shaft 49 toward the left of the drawing to displace lever 10 in a clockwise direction from a condition of unbalance, through a balanced condition and then into an unbalanced condition in the opposite direction. In the latter unbalanced condition contacts 67 and 68 engage thus operating amplifier 69 which causes the uni-directional intermittently operable motor 70 to drive into differential 74. Motor 70 drives the differential at double the rate of motor 76 thereby reversing the direction of output shaft 87 of the differential which causes cam 50 to move in translation in the opposite direction thereby displacing the fulcrum shaft 49 towards the right of the drawing returning the lever to equilibrium and separating contacts 67 and 68 thereby stopping motor 70. As motor 76 is constantly operating, the cycle is repeated and the lever is maintained in a state of dynamic equilibrium about its fulcrum. With the lever in balanced position, which is the case when the servo unit is functioning properly, the translational force for the fulcrum shaft 49 would be theoretically zero. This is assumed by neglecting second order frictional forces and the force of spring 51 which holds cam follower 48 against the surface of cam 50.

When the instrument has been once adjusted, the position of fulcrum shaft 49 required to balance lever 10 will vary in accordance with the output displacement of bellows 18 and since this position depends on the displacement of output shaft 87 of the differential, this shaft, in the case of a true altitude meter, will provide a measure of true altitude.

In a true altimeter where the cam 50 is positioned in rotation according to mean absolute temperature, $T_{ma}$, which as explained above varies with altitude, the cam is constantly displaced in rotation to correct $T_{ma}$ for changing altitude by gear 115 which is driven through friction clutch 114 by the differential output shaft 87. Since knob 103 is connected by a gear and shaft arrangement with the gear 96 on cam 50, the position of knob 103 is also corrected as true altitude changes.

*True air speed meter*

Air-speed meters in general use today give a measure of indicated air-speed which must be corrected for the variation of air density. This correction is computed by the navigator, from tables, or by using a special computer which is similar to a circular slide rule.

According to the invention herein, automatic determination and utilization of instant true air-speed values are made possible by measuring, at the airplane, air temperature $T_p$, the total air pressure $P_G$, and the static air pressure $P_s$. The total air pressure, and the static air pressure are measured by suitable aneroid devices connected to a Pitot tube mounted in the undisturbed air stream of the airplane. As shown and described more in detail herein, the air pressure components or forces are measured with the aid of the novel force-ratio measuring instrument. A servo motor translates a movable fulcrum to balance the pressure moments. The fulcrum position is varied by a cam surface which may be rotated in accordance with temperature and translated in accordance with true air-speed. A follow-up, or servo motor, is controlled by any unbalance at the fulcrum position due to changes in the pressure ratios.

In the form of the invention of Fig. 3, there is shown, schematically, a true air-speed meter wherein the gross $P_G$, and static $P_s$ air pressure forces are applied in opposition to opposite ends of a lever.

It is to be understood that the instrument shown in Fig. 3 is of the same general construction as that shown in Fig. 1, particularly with respect to the lever supporting arrangement, the fulcrum structure, and the actuating means for the fulcrum. Details of the mechanism shown in Fig. 1 are omitted in Fig. 3 for the sake of clarity and to avoid unnecessary repetition. A lever, fulcrum, and the actuating means for the lever are shown in Fig. 3 enclosed in a casing 199 which may be sealed, or open to the atmosphere, depending on how the instrument is to be used. Various parts shown as being attached to the casing, will be understood to be supported therein in any convenient manner.

Lever 200, Fig. 3, is provided with a movable fulcrum shown in cross section as a shaft 201 mounted in a carriage 202 to which is attached a cam follower pin 203. Spring 204 attached to the carriage holds the end of the cam pin against the surface of a three dimension cam 225.

Lever 200 is supported as in Fig. 1 by a flat spring 206 attached to one end thereof and extending in the direction of the lever. A flat spring 207 arranged at right angles to spring 206 and in the same plane supports the opposite end of the lever. In the present embodiment of the invention, a pair of opposing bellows is attached to the lever on each side of the fulcrum. Bellows 210 is attached by a flat spring 211 to the upper left hand side of the lever. A flat spring 212 attached to the underside of the lever in alignment with spring 211 is connected to bellows 213. Bellows 214 is connected by flat spring 215 to the upper surface of the lever near the right hand end thereof. A flat spring 216 connected to the under side of the lever in alignment with spring 215 is connected to the upper surface of bellows 217.

Bellows 210 is connected to the static pressure conduit 220 of a Pitot tube 221. Bellows 214 is connected to the gross pressure conduit 222 of Pitot tube 221. Bellows 213 and 217 are evacuated and thus subject only to the air pressure $P_c$ obtaining within the casing 199. The respective bellows are identical and when set up as described, the inherent spring tensions of bellows 210 and 214 are counterbalanced by the respective bellows 213 and 217. All four bellows are subject to the static air pressure $P_c$ in the casing 199 and when the lever is in balanced position only static air pressure $P_s$ from bellows 210 acts on the left hand arm of the lever while bellows 214 exerts gross air pressure $P_G$ only, on the right hand arm of the lever.

Cam 225 is a three dimension cam supported on shafts 226 and 227 which are free to rotate and translate in bearings 230 and 231. The cam is displaced in rotation by a knob 232 fixed to a long pinion 233 in mesh with gear 229 fixed to the cam. The cam is displaced in translation by a servo system responsive to unbalance of lever 200 generally similar to that of Fig. 1 which has been described.

A constant speed motor 234 drives an input shaft 235 of a differential 236. The output shaft 237 of the differential has a gear 240 fixed thereto which meshes with a circular rack 241 formed on cam shaft 226 for the purpose of translating the cam. A second input shaft 242 for the differential is driven by an intermittently operable, uni-directional motor 243. The latter motor is controlled by the output of an amplifier 244 having an input circuit 245 operatively connected with cooperating contacts 246 and 247, the former being fixed, and the latter mounted on lever 200. As in the case of Fig. 1, the motor 243 operates at a greater rate, preferably double the rate of constant speed motor 234.

A shaft 250 driven by the constant speed motor drives an eccentric mechanism 251 which actuates a dither spring 252 connected to lever 200. A spring 253 is connected to the lever in alignment with spring 252, to counterbalance spring 252.

As will be explained, the displacement of differential output shaft 237 is a measure of the ratio of the forces acting on the lever, and in the present embodiment of the invention this displacement is also a measure of true air-speed. A gear 255 fixed to shaft 237 drives a gear 256 coupled to a flexible shaft 260, which has an output torque sufficient to actuate a computer or other device requiring an air-speed input with appreciable torque. By way of example, flexible shaft 260 is shown as driving a true air-speed indicator 261.

True air-speed is given by the following equation:

(13) $$V = \sqrt{7RT_P\left[\left(\frac{P_G}{P_S}\right)^{\frac{1}{3.5}} - 1\right]}$$

where $V$ = true air-speed
$T_P$ = absolute free air temperature at the airplane
$R$ = gas constant
$P_G$ = gross air pressure as obtained by the impact of a Pitot static tube
$P_S$ = static air pressure at the airplane
$P_D$ = dynamic air pressure

(14) $$P_G = P_S + P_D$$

substituting the value of $P_G$ from Equation 14 in Equation 13, the following equation is obtained:

(15) $$V = \sqrt{7RT_P\left[\left(1 + \frac{P_D}{P_S}\right)^{\frac{1}{3.5}} - 1\right]}$$

From Equations 13 and 15 it will be seen that true air-speed $V$, of the airplane, is a ratio of either one of two pressures, $$\frac{P_G}{P_S}, \text{ or } \frac{P_D}{P_S}$$

and is also a function of the absolute free air temperature $T_P$ at the airplane. Since these equations show that true air-speed is a function of the ratio of two pressures, there is no point in measuring the individual pressures themselves as has been done heretofore. To this end, the novel true air-speed meter herein can be constructed to operate according to the conditions or factors determined by either one of Equations 13 and 15, the embodiment of Fig. 3 being constructed to provide a measure of true air-speed in accordance with Equation 13.

When the lever 200 is in balanced position, only the static air pressure $P_S$ acts on the left hand end of the lever and only the gross air pressure $P_G$ acts on the right hand end of the lever.

Referring to Fig. 2, and equations given above in connection therewith, the equations of the force moments of the lever arms, at balance, for Fig. 3, are

(16) $\qquad aP_S = bP_G$ as (17) $\qquad a = L - b$ then (18)

$$b = \frac{L}{1 + \frac{P_G}{P_S}}$$

The pressure $P_C$ in the case 199 of the instrument of Fig. 3, will act equally on all the bellows, and, hence, their effects will balance out.

As developed in Equation 13, the true air-speed $V$ is a function of the ratio of gross pressure $P_G$, to static pressure $P_S$, and a function of the absolute free air temperature $T_P$ at the airplane. The fulcrum 201 can therefore be shifted in position to establish controlling ratios between $P_G$ and $P_S$ by the three-dimensional cam 225, which in the embodiment shown in Fig. 3 is laid out according to Equation 13.

Cam 225, as in the case of Fig. 1, is displaced according to $T_P$ by the $T_P$ knob 232. The cam is displaced in translation according to true air-speed $V$ by the output shaft 237 of differential 236.

With the apparatus in operation, and with contacts 246 and 247 open, the constant speed motor 234 will drive the fulcrum and thereby unbalance the lever, causing the operating circuit for motor 243 to close. This motor runs at twice the speed of motor 234, and feeds into the differential in opposition thereto. The output shaft of the differential is thus reversed in direction, which reverses the direction of fulcrum 201 to the equilibrium position of the lever. Contacts 246 and 247 thereupon disengage and constant speed motor 234 again drives the cam to displace the fulcrum from its equilibrium position. This automatic make-and-break cycle is continued as long as the apparatus is in use. Due to the operational speeds of the motors, the fulcrum 201 is maintained apparently stationary, as a dynamic pivot.

Improved results are obtained by dithering the lever. To this end, the constant speed motor rotates eccentric 251 at a speed of at least twice the natural vibration frequency of the balance system. Eccentric 251 acting through spring 252 dithers the balance arm continuously, so that there is a continuous, uninterrupted make-and-break of contacts 246 and 247, and a resulting dynamic balance of the moving parts of the system. Coulomb friction in the mounting members is overcome, and instantaneous response to variations in conditions being measured is assured.

When a change occurs in a condition being measured, the force-responsive device responsive thereto would normally be actuated to a degree corresponding to the variation in the applied force.

Under the null control system herein, any change in conditions automatically gives rise to a change in ratios of the conditions, with the result that the fulcrum must seek a new position of balance or equilibrium for the system. The shifting of the fulcrum under conditions of varying force moments will be controlled by the amount and duration of the applied force, which is exhibited in the variation of the time of apposition of contacts 246 and 247, necessary to restore the system to its new equilibrium condition by shifting the fulcrum to the new balance position required to equalize the force moments of the lever. As above noted, the speed of operation of the fulcrum equilibration and concomitant dither of the balance arm or lever, is such that transient variations in force conditions being measured are imposed, in passing, on a dynamically responsive system, and require substantially no inherent power to be fully effective for control of the system.

*Combination true altitude, altitude rate and true air-speed meter*

A combination instrument for determining true air-speed, true altitude and altitude rate of the supporting aircraft is shown in Fig. 4. The instruments combined therein include a true altitude device similar to that of Fig. 1, and by way of example, a modification of the true air-speed meter of Fig. 3. The combined instrument has the advantage that the only values required to be manually inserted are target pressure $P_T$, temperature at the plane $T_P$, and temperature at the target $T_T$. A further, and an important advantage is the provision of an arrangement effective to adjust the combined instrument constantly and automatically for changing temperature due to changing altitude.

It will be understood that the true altitude force measuring device of Fig. 4 is the same mechanically as that shown in Fig. 1, various details being omitted to simplify the drawing.

As in Fig. 1, Fig. 4 shows a lever 10 mounted on a fulcrum 40 which is attached to a lift pin 48 actuated by a cam 50 supported for rotation and translation. Evacuated bellows 18 responsive to changes in air pressure is connected to one end of lever 10 and is counter balanced by dither spring 88 connected to an eccentric mechanism on shaft 79 driven by shafts and gears, including gears 80 from shaft 77 of constant speed motor 76. It is thought that the driving arrangement for the eccentric 81 can be understood by inspection and no need is apparent for detailed description of the various shafts actuated by motor 76. While some modification has been necessary over the showing in Fig. 1 to connect motor 76 with the apparatus associated with both levers, it will be understood the showing of the true altitude meter in Fig. 4 is substantially the same as that of Fig. 1.

Spring 52 connected to lever 10 is adjusted by knob 58 which is provided with a dial 60 settable with reference to a fixed index 61. Spring 62 is connected to lever 10 to counterbalance spring 52.

Contact 68 fixed to lever 10 cooperates with stationary contact 67, and the contacts control the input circuit of amplifier 66. The output circuit of the amplifier controls the operation of a uni-directional servomotor 70, the motor being controlled intermittently in accordance with the engagement of contacts 67 and 68. The shaft 71 of motor 70 drives one input of differential 74, another input of the differential is driven by shaft 77 of constant speed motor 76, the output shaft 99 of differential 74 cooperates with a rate measuring device, and in conjunction therewith provides an output displacement with torque according to altitude rate. This rate measuring mechanism will be described further on.

In the true air-speed instrument of Fig. 3, true air-speed was determined as a function of the ratio of gross pressure $P_G$ to static pressure $P_S$ according to Equation 13. Fig. 4 shows a modification of the invention in which true air-speed is computed as a function of the ratio of dynamic pressure $P_D$ to static pressure $P_S$ according to Equation 15.

It will be understood that in determining true air-speed V, and true altitude H, static pressure $P_S$ is a factor or condition to which both instruments are responsive. Additionally, dynamic pressure $P_D$, is readily obtained by subtracting static pressure $P_S$ from gross pressure $P_G$. Because of the common static pressure component for both instrument systems, the operative parts, including the pressure responsive devices, may be advantageously enclosed in a common casing which will be connected to the static pressure input of a Pitot tube, while the gross pressure responsive device will be connected directly to the gross pressure opening of the same Pitot tube.

The true air-spaced computing portion of Fig. 4 will now be described, reference characters corresponding to those of Fig. 3 being used where possible. It will be understood that the force ratio measuring system used therefor in Fig. 4 will have many features in common with the instruments already described, particularly the levers 10 and 200, the supports and the movable fulcrum therefor which will be substantially the same as shown in Fig. 1, while the counterbalanced bellows arrangement for the true air-speed portion of the mechanism is the same as that disclosed in Fig. 3 except for certain differences which will be pointed out as the description progresses. It will be noted in the following description that a common constant speed motor 76 is used to dither both levers 10 and 200 and this motor cooperates with a pair of servomotors individual to the levers. These servomotors are actuated respectively as in Figs. 1 and 3.

Lever 200 is shown in Fig. 4 supported on movable fulcrum 201 which is displaced by lift pin 203 of cam 300. A bellows 214 is attached to one arm of lever 200, the bellows 214 being connected to the gross air pressure conduit 222 of Pitot tube 221 while spring 217 is used to counterbalance bellows 214. The interior of the casing 199, which in the present instance is sealed, is connected to the static $P_S$ conduit 220 of the Pitot tube. Evacuated bellows 213 is connected to the opposite end of the lever and is counterbalanced by spring 252 which is dithered by eccentric mechanism 251 on shaft 79.

Contact 247 on lever 200 cooperates with stationary contact 246 to control amplifier 244 which in turn controls intermittently, according to the operation of the contacts the unidirectional servomotor 243. This motor 243 has a shaft 242 coupled with an input of differential 236. The second input of this differential is driven by constant speed motor 76 through shaft 77, gears 169, and shaft 235. The output shaft 237 of the differential is displaced, as will be explained in accordance with true air-speed, and a gear 255 thereon drives a gear 256 coupled with flexible shaft 260 which may be used to operate a suitable true air-speed indicating device 261 such as shown in Fig. 3 and/or furnish a power drive proportional to true air-speed for a computer.

The output shaft 237 of differential 236 has a pinion 240 fixed thereon in mesh with circular rack 241 attached to cam shaft 226 whereby the cam 300 is displaced in translation from the output of differential 236 in the same manner as the instrument shown in Fig. 3.

The long pinions 97 and 233 are adjusted in rotation by a common $T_P$ knob 262 provided with a scale 263 which is positioned with respect to a stationary index 264. Knob 262 is mounted on a shaft 265 on which is fixed a gear 266 in mesh with a similar gear 267 fixed on shaft 270. A gear 271 on shaft 270 is in mesh with gear 272 on shaft 273 on which long pinion 233 is also fixed. Cam 300 is displaced in rotation through the gear train just described according to $T_P$ by knob 262. Cam 50 is displaced in accordance with $T_{ma}$ by the following train of mechanism:

Shaft 265 is coupled with one input of an adding differential 275 and displaces the same when knob 262 is adjusted according to temperature at the airplane, $T_P$. Knob 276 drives a second input of differential 275. Knob 276 is fixed to a dial 277 calibrated according to target temperature, $T_T$ which is positioned with reference to an index 280. Output shaft 281 of the differential 275 is connected by gears 282 to shaft 100 which carries the long pinion 97 for displacing cam 50 in rotation. The mechanism just described for rotating cam 50 is equivalent to that shown in Fig. 1 by which cam 50 is displaced on rotation according to $T_{ma}$. In the arrangement of Fig. 4, differential 275 adds the displacements of knobs 262 and 276 and the gears actuated thereby have such ratio as to turn cam 50 according to the equation for $T_{ma}$ given by Equation 6.

Cam 50 is displaced in translation according to altitude as in Fig. 1, but the arrangement shown in Fig. 4 includes a device for providing a measure of the rate of change of altitude, which, generally speaking is controlled in the same way from the lever operated circuits as the embodiment of Fig. 1.

Constant speed motor 76 drives through gears 284 and shaft 285 an input for differential 74. Contacts 67 and 68 actuated by lever 10 control the input circuit of an amplifier 66 having an output which controls, intermittently, according to the forces acting on lever 10 the unidirectional motor 70, having a shaft 71 which actuates a second input of differential 74.

Output shaft 99 of differential 74 is coupled to an input of a differential 290. This differential is used for stabilization, as will be described. A gear 291 fixed to output shaft 99 meshes with a rack 292 attached to a movable ball carriage 293 of a variable speed drive 294. The ball carriage cooperates in the known manner with a disc 295 driven by constant speed motor 76, and an output drum 296. The drum drives a shaft 297 coupled with a second input of differential 290. The output shaft 289 of differential 290 carries a gear 299 in mesh with rack 85, coupled with cam 50, the arrangement being used for translating the cam. Shaft 289 is coupled by a friction clutch 114 with shaft 270 which functions in the same manner as the corresponding clutch of Fig. 1 to correct the position of knob 262 for changing altitude, and in addition, the position of cam 300 is automatically corrected in rotation with the changing position of knob 262 by the train of shafts and gears already described for changing $T_{ma}$ due to changing temperature at the plane $T_P$ which is, in turn, due to changing altitude. This automatic correction of the apparatus for changing altitude is an important feature of the invention.

Cam 50 of Fig. 4 is the same as the corresponding cam of Fig. 1 and the displacement thereof in translation required to balance lever 10 is in accordance with true altitude. Accordingly, a true altitude flexible output shaft 91 is shown coupled with shaft 289 by gears 92 and 93 in the same manner as Fig. 1.

The displacement of output shaft 99 of differential 74 is a measure of the rate of change of altitude as will be described. A flexible output shaft 310 which may be used to drive the mechanism of a computer or an indicating device is coupled with output shaft 99 by gears 311 and 312.

When lever 10 becomes unbalanced due to a change in altitude, motors 70 and 76 cooperate to drive the cam in translation in such direction as to balance the lever. When altitude is not changing, lever 10 is balanced and both motors cause shaft 99 to oscillate slightly about a predetermined balanced angular zero output position. The ball carriage 293 is then over the center of the disc at zero output position and drum 296 is stationary. If altitude changes, shaft 99 is displaced causing the ball carriage 293 to move away from the center of the disc and the drum to turn, and differential 290 adds the displacement of the drum to that of shaft 99, and output shaft 289 differential 290 displaces cam 50 in translation until lever 10 is balanced by the resulting displacement of its fulcrum whereupon the effect of motors 70 and 76 is balanced and shaft 99 and ball carriage 293 are in their zero output positions. If altitude is changing at constant rate, the ball carriage will seek a position to give an output rotation of drum 296 which will displace drum 50 in translation corresponding with changing altitude. When altitude is thus changing at constant rate output shaft 310 is displaced by differential output shaft 99 in proportion to the rate of change.

The stabilizing effect of differential 290 perhaps can be explained best by consideration of the apparatus without such differential and the drum 296 as being coupled directly to gear 299 which translates cam 50. Then, during normal operation of the device, on closing of contacts 67 and 68 the unidirectional motor 70 would drive into differenial 74 causing displacement of shaft 99 and ball carriage 293. For purposes of explanation, assume that the ball carriage is displaced some amount in zero time. It will then take a finite time for the drum to accumulate a displacement necessary to displace the cam to open the contacts 67 and 68 and cut off motor 70. Meantime, the shaft 99 has continued to turn and the ball carriage is displaced an excessive amount before the contacts open. When motor 70 is cut off by the opening of the contacts, the cam and fulcrum have overshot, that is, they have been moved excessively, and a greater time is required for constant speed motor 76 to move the fulcrum back to a position wherein the lever is unbalanced in the opposite direction and the contacts closed again. Consequently, without the stabilizing differential 290, the mechanical circuit will oscillate excessively.

With the arrangement of Fig. 4, when contacts 67 and 68 close, shaft 99 will turn in such direction as to cause the cam to displace the fulcrum to open the contacts immediately. For purposes of explanation, assume drum 296 is stationary for the moment and that displacement of shaft 99 has moved in zero time the ball carriage to some position away from the center of disc 295. Then the instant displacement of shaft 99 added to the momentary fixed position of the differential input shaft 297 will cause displacement of the output shaft 289 and translation of the cam. This displacement may be such as to open the contacts before any effective movement of drum 296 takes place.

In order to show complete instruments, manually operable temperature knobs have been shown in the various figures. It will be understood that this showing is by way of example only, as there are accurate thermometer controlled instruments available commercially which might be used to replace the knobs and control the apparatus automatically, according to temperature.

It is not intended to restrict the various instruments shown herein to the use of contact means for controlling the various servo equipments. Figs. 5 and 6 show schematically an inductive pick-off arrangement which might be used with any of the lever arrangements disclosed herein in place of the contact circuits. The pick-off device is a known instrument and therefore will be briefly described.

Referring to Fig. 5, a laminated, closed core 320 of magnetic material has two pairs of spaced opposing pole pieces, 321, 322, 323 and 324, on which respectively are windings 325, 326, 327 and 328. An armature 329 is normally disposed symmetrically between the pole pieces. The drawing shows the armature 329 as being actuated by lever 10 indicated in dotted lines. Fig. 6 shows a wiring diagram of the inductive device in which the windings are connected in a bridge circuit in which corresponding apexes of the bridge are energized by a source 330 of alternating current while amplifier 331 is connected across the bridge by leads 332 and 333. With the arrangement described, when the armature is centered or disposed symmetrically with respect to the coils as shown in Fig. 5, no current flows to the amplifier. Even slight displacements of the armature will upset the inductive balance of the circuit and cause the input circuit for the amplifier to become energized.

What is claimed is:

1. A true air-speed meter comprising a lever, coplanar flat suspension springs for the lever at the ends thereof, a movable fulcrum for the lever, a plurality of force applying means for the lever including a bellows actuated according to dynamic pressure connected to one arm thereof, a second bellows actuated according to static pressure connected to the opposite arm of the lever, means for oscillating the fulcrum about a position wherein the lever is in balanced condition to obtain a measure of the ratio of the forces applied to the lever which comprises a cam laid out in accordance with functions of air pressure and temperature, a follower for said cam operable to displace the fulcrum, motor means for actuating the cam, including an intermittently operable servomotor controllable by the lever when displaced in a predetermined direction from a balanced condition, and a true air-speed measuring device actuated by the motor means in fixed relation with the cam.

2. A true air-speed meter comprising a lever, coplanar flat suspension springs for the lever at the ends therof, a movable fulcrum for the lever, a plurality of force applying means for the lever including a bellows connected to said lever actuated according to dynamic air pressure, a second bellows actuated according to static air pressure connected to the lever in opposition to the first mentioned bellows, means for counterbalancing both of said bellows, means for oscillating the fulcrum about a position wherein the lever is in balanced condition to obtain a measure of the ratio of the forces applied to the lever which comprises a cam laid out in accordance with functions of air pressure and temperature, a follower for said cam operable to displace the fulcrum, motor means for actuating the cam, including an intermittently operable servomotor controllable by the lever when displaced in a predetermined direction from a balanced condition, and a true air-speed indicating device actuated by the motor means in fixed relation with the cam.

3. A true air-speed meter comprising a lever, a movable fulcrum therefor, a pair of bellows connected respectively to the lever near opposite ends thereof, a chamber enclosing the lever and bellows, a Pitot tube having a static air conduit connected to the chamber and a gross pressure tube connected to one of the bellows, the other bellows being evacuated, means including a three dimension cam laid out in accordance with functions of air pressure and temperature for displacing the fulcrum, means for oscillating the cam to oscillate the fulcrum about a position wherein the lever is in balanced condition to obtain a measure of the ratio of the forces applied to the lever which comprises a cam follower connected to the fulcrum, motor means for actuating the cam including an intermittently operable motor, means responsive to the displacement of the lever in a predetermined direction from a balanced condition for actuating the motor, a second motor operable at constant speed and at a lower effective rate for displacing the cam in the opposite direction, differential means having inputs respectively connected for rotation by said first and second motor means and an output, a true air-speed measuring device, and means connected with said output for actuating said cam and measuring device.

4. A true air-speed meter comprising a lever, a movable fulcrum therefor, a pair of bellows connected respectively to the lever near opposite ends thereof, a chamber enclosing the lever and bellows, a Pitot tube having a static air conduit connected to the chamber and a gross pressure tube connected to one of the bellows, the other bellows being evacuated, a counterbalance spring for each of the bellows secured to the lever, means including a three dimension cam laid out in accordance with functions of air pressure and temperature a follower for said cam operable to displace the fulcrum, means for displacing the cam in one dimension according to temperature, means for displacing the cam in another dimension comprising a constant speed motor, a differential mechanism actuated thereby having an output shaft effective to displace the cam and follower, said motor being effective normally to displace the cam and follower to unbalance the lever about the fulcrum in one direction, an intermittently operable servomotor coupled with the differential, means controlled by the lever when thus unbalanced for actuating the servomotor, said servomotor being effective to drive the output shaft in the opposite direction to restore the lever to a balanced condition, and true air-speed measuring means controlled by the output shaft.

5. In a combined true altitude-true air-speed meter, a true air-speed computing device including a cam initially settable in one dimension according to temperature, a true altitude computing device having an ouput shaft constantly displaceable in accordance with changes in true altitude, and means for displacing the cam in said dimension to correct automatically the setting thereof for temperature changes due to changing altitude.

6. In a combined true altitude-true air-speed meter, a true altitude computing device, having an output member displaced according to true altitude, a true air-speed measuring device comprising a lever, a movable fulcrum therefor, a pair of bellows connected respectively to the lever near opposite ends thereof, a chamber enclosing the lever and bellows, a Pitot tube having a static air conduit connected to the chamber and a gross pressure conduit connected to one of the bellows, the other bellows being evacuated, spring means attached to the lever for counterbalancing the respective bellows, means including a three dimension cam laid out in accordance with functions of air pressure and temperature, means for initially setting the cam in one dimension in accordance with temperature, means controlled by the lever on displacement thereof from a balanced position for actuating the cam in a second dimension, a follower for said cam connected to the fulcrum to maintain the latter oscillating about a position wherein the lever is balanced, true air-speed indicating means operated by the cam actuating means, and means coupling the output member of said altitude device and the cam effective to change the setting of the cam in accordance with temperature changes due to changing altitude.

7. A true altitude rate meter which comprises a force ratio measuring apparatus including a lever adapted to have force moments applied thereto, a movable fulcrum therefor, a three dimension cam laid out according to an equation of true altitude, a follower for said cam connected to displace said fulcrum, means for displacing the cam in one dimension according to temperature, means for displacing the cam in a second dimension effective to oscillate the fulcrum about a position wherein the lever is balanced comprising a variable speed mechanism having a speed adjusting member, a constant speed motor therefor, a servomotor, means controlled by the lever when unbalanced for actuating the servomotor, a differential mechanism jointly controlled by both motors, an output shaft therefor, the servomotor having a greater rate than the constant speed motor thereby being effective when operating to reverse the direction of the output shaft, means controlled by the output shaft for displacing the speed adjusting member of the variable speed mechanism, a differential jointly controlled by the output shaft and the output of the variable speed mechanism having an output member operatively coupled to the cam, the arrangement being such that the displacement of the output member required to maintain the lever in balanced condition is proportional to altitude, while the displacement of the output shaft of the first mentioned differential is proportional to the rate of change of altitude.

8. A true altitude rate meter which comprises a lever, an evacuated bellows connected to one arm of the lever, a spring tensioned according to temperature connected to the opposite arm of the lever in opposition to the bellows, a movable fulcrum for balancing the force moments applied to the lever, a three dimension cam laid out according to an equation of true altitude including functions of air pressure and temperature, a follower for said cam connected to displace said fulcrum, means for displacing the cam in one dimension according to temperature, means for displacing the cam in a second dimension to oscillate the fulcrum about a position wherein the lever is balanced comprising a variable speed mechanism having a speed adjusting member, a constant speed motor therefor, a servomotor, means controlled by the lever when unbalanced for actuating the servomotor, a differential mechanism jointly controlled by both motors, an output shaft therefor, the servomotor having a greater rate than the constant speed motor thereby being effective when operating to reverse the direction of the output shaft, means controlled by the output shaft for displacing the speed adjusting member of the variable speed drive, a stabilizing differential jointly controlled by the output shaft and the output of the variable speed mechanism having an output member operatively coupled to the cam, the arrangement being such that the displacement of the output member required to maintain the lever in balanced condition is in proportion to altitude while the displacement of the output shaft of the first mentioned differential is proportional to the rate of change of altitude.

9. A true altitude rate meter which comprises a lever, an evacuated bellows connected to one arm of the lever, a spring tensioned according to temperature connected to the opposite arm of the lever in opposition to the bellows, spring means attached to the lever for counterbalancing the bellows, a movable fulcrum for the lever, a three dimension cam laid out according to an equation of true altitude including functions of air pressure and temperature, a follower for said cam connected to displace said fulcrum, means for dithering the lever, means for rotating the cam in accordance with temperature, means for translating the cam to oscillate the fulcrum about a position wherein the lever is balanced comprising a variable speed mechanism having a speed adjusting member, a constant speed motor therefor, a servomotor, means controlled by the lever when unbalanced for actuating the servomotor, a differential mechanism jointly controlled by both motors, an output shaft therefor, the servomotor having a greater rate than the constant speed motor thereby being effective when operating to reverse the direction of the output shaft, means controlled by the output shaft for displacing the speed adjusting member of the variable speed drive, a stabilizing differential jointly controlled by the output shaft and the output of the variable speed mechanism having an output member operatively coupled to the cam for translating the same, the arrangement being such that the displacement of the output member of the stabilizing differential required to maintain the lever in balanced condition is in proportion to altitude, while the displacement of the output shaft of the first mentioned differential is proportional to the rate of change of altitude.

10. In a system for determining true altitude and true air-speed, a true air-speed computing device including a cam member laid out in accordance with true air-speed as a function of air pressure and air temperature, means for initially positioning said cam in accordance with existing air temperature, a true altitude computing device, and means operated by said true altitude computing device for changing the position of said cam in accordance with changes in true altitude, whereby to modify the determined true air-speed in accordance with changes in air temperature due to changes in true altitude.

11. In a system for determining true air speed comprising, a lever, a movable fulcrum therefor, means including a pair of bellows connected near opposite ends of said lever for applying differential moments about said fulcrum proportional to pressure differentials acting on said bellows, a first of said bellows being actuated in accordance with dynamic pressure and the other of said bellows being actuated in accordance with static pressure, and means responsive to the unbalancing of said lever about said fulcrum in response to the differential changes in said moments for displacing said fulcrum to such a position as to restore said lever to a balanced condition, said last-mentioned means including a cam laid out in accordance with an equation for true air speed and a cam follower connected to move said fulcrum in accordance with movements of said cam.

ROBERT F. GARBARINI.
JOHN R. ERICSON.

REFERENCES CITED

The following references are of record in the file of this patent:

UNITED STATES PATENTS

| Number | Name | Date |
|---|---|---|
| 248,384 | Cornwall | May 24, 1927 |
| 1,968,539 | Rydeberg | July 31, 1934 |
| 2,251,498 | Schwien | Aug. 5, 1941 |
| 2,318,153 | Gilson | May 4, 1943 |
| 2,398,470 | Shivers | Apr. 16, 1946 |

FOREIGN PATENTS

| Number | Country | Date |
|---|---|---|
| 27,770 | Great Britain | Dec. 3, 1912 |
| 407,903 | Germany | Jan. 5, 1925 |
| 575,008 | Great Britain | Jan. 30, 1946 |

OTHER REFERENCES

NACA Wartime Report L-423 entitled "NACA Mach Number Indicator For Use in High Speed Wind Tunnels," by Norman F. Smith. This report was originally issued July 1943 as advanced Confidential Report 3G31 and was declassified May 1947. It contains six pages of description, two pages of drawings, and two pages of graphs.